Figure 1:
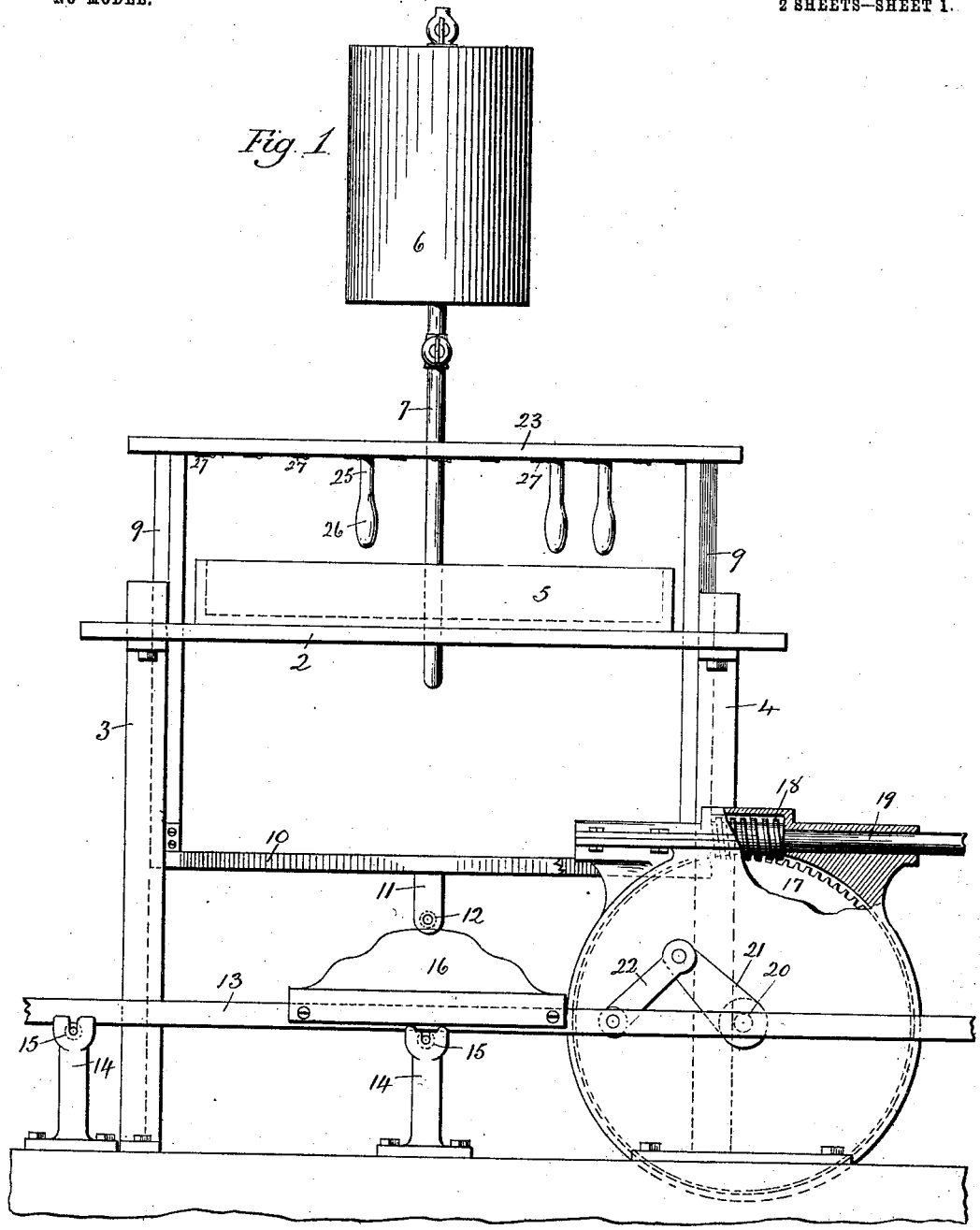

No. 763,682. PATENTED JUNE 28, 1904.
C. E. LONGDEN.
MACHINE FOR FORMING RUBBER ARTICLES.
APPLICATION FILED APR. 9, 1904.
NO MODEL. 2 SHEETS—SHEET 1.

Witnesses. Charles E. Longden.
Inventor.
By Atty. Seymour & Earle

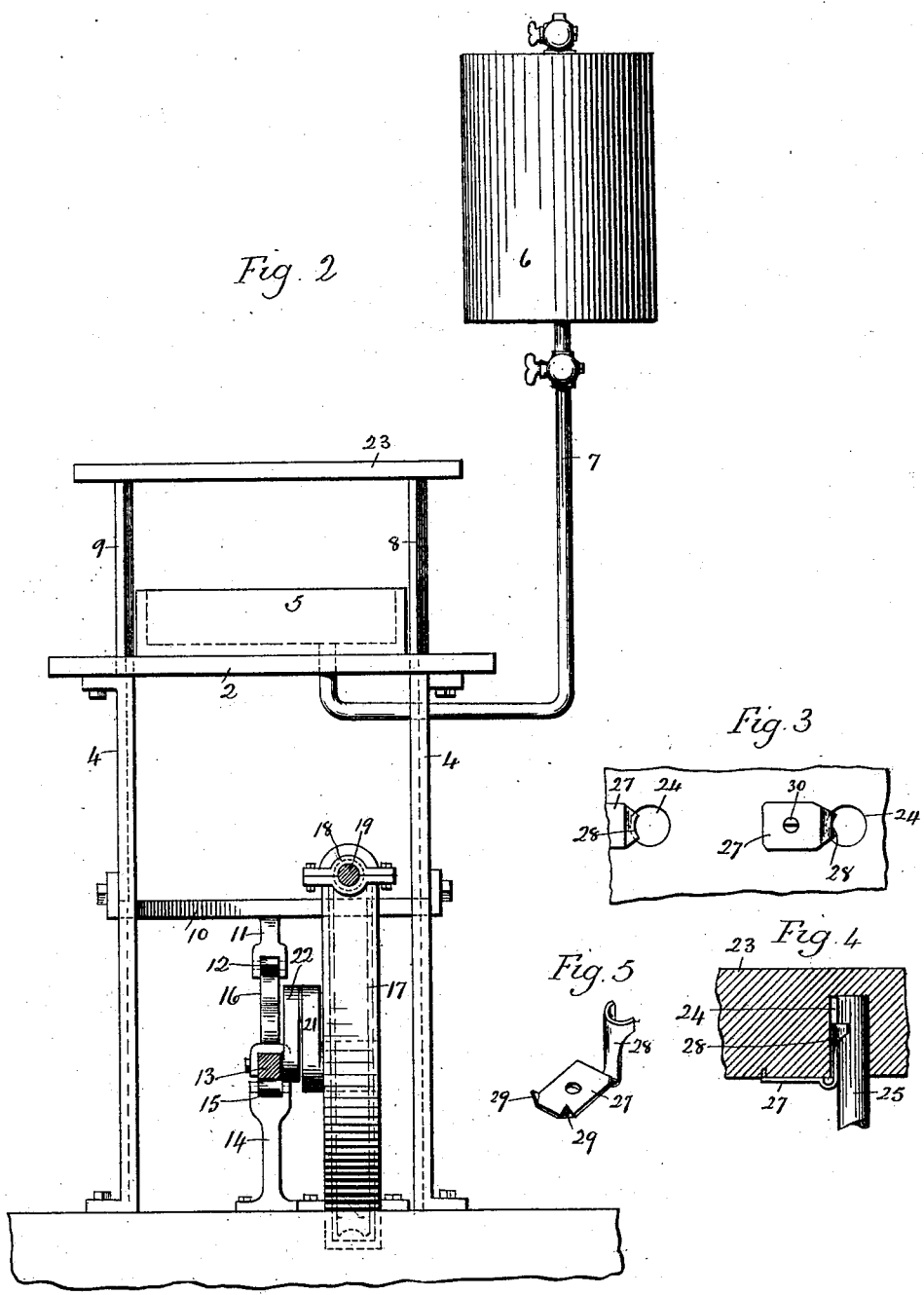

No. 763,682. Patented June 28, 1904.

UNITED STATES PATENT OFFICE.

CHARLES E. LONGDEN, OF HAMDEN, CONNECTICUT.

MACHINE FOR FORMING RUBBER ARTICLES.

SPECIFICATION forming part of Letters Patent No. 763,682, dated June 28, 1904.

Application filed April 9, 1904. Serial No. 202,334. (No model.)

*To all whom it may concern:*

Be it known that I, CHARLES E. LONGDEN, of Hamden, in the county of New Haven and State of Connecticut, have invented a new and useful Improvement in Machines for Forming Rubber Articles; and I do hereby declare the following, when taken in connection with the accompanying drawings and the figures of reference marked thereon, to be a full, clear, and exact description of the same, and which said drawings constitute part of this specification, and represent, in—

Figure 1, a front view of a machine constructed in accordance with my invention; Fig. 2, an end view thereof; Fig. 3, a broken plan view of the under face of the moldboard; Fig. 4, a sectional view through one of the recesses therein; Fig. 5, a perspective view of the mold-holding clip detached.

This invention relates to an improvement in a machine for forming rubber articles by dipping, and especially for forming rubber nipples, which are produced by dipping a form or mold into a tank or reservoir of rubber in solution; and the invention particularly relates to an improvement in machines of this character in which the tank or reservoir is mounted upon a table and means for supporting molds arranged above it and adapted to be raised and lowered, so that the molds will be dipped into the tank and removed therefrom at intervals, so as to permit one coat to dry or partially dry before the next dipping. As usually employed a number of machines are arranged in a line, so as to be operated by the same means; and one object of this invention is to provide convenient means for raising and lowering the molds.

A further object of the invention is to produce a simple arrangement of devices for holding molds; and the invention consists in the construction as hereinafter described, and particularly recited in the claims.

In carrying out my invention I employ a table 2, supported by legs 3 4. Upon the top of the table a tank 5 is placed, which tank is fed from a reservoir 6 or from any other source of supply through a pipe 7 to the bottom of the tank. Passing vertically through the table are four slides 8 9, which are guided by the legs 3 4 and connected at their lower ends by a web 10, said web being formed at its center with a downwardly-projecting arm 11, carrying a roller 12.

Extending transversely beneath the machine between the front and rear legs is a shaft 13, which is supported for longitudinal movement on brackets 14, carrying antifriction-rollers 15 at their upper ends, on which the shaft rests. Adjustably secured to this shaft are cams 16, on which the roller 12 will ride, the form of the cam being such as to move the web and give the slides the desired movement. Mounted at one side of the shaft is a worm-gear 17, which is turned by a worm 18, mounted on a shaft 19, which will be driven from pulleys in the usual way. Upon the axle 20 of the worm-gear 17 is a crank-arm 21, connected by a link 22 with the said shaft 13 and so that as the worm-gear is revolved the shaft will be moved back and forth.

With this device I employ a moldboard 23, which is adapted to rest upon the upper ends of the slides. In the under face of this moldboard are a series of recesses 24, adapted to receive the stems 25 of molds 26, and to hold these molds in position I employ plates 27, which are adapted to be secured to the under side of the board adjacent to the holes 24, said plates being formed with transversely-bowed spring-fingers 28, which extend into the holes 24, and with spurs 29, which assist in holding the plates in position, they being otherwise secured by screws 30, passing through the center of the plates. By forming the moldboard with recesses in its under face which do not pass entirely through the board I am enabled to arrange the molds with more regularity than when the molds pass entirely through the board, and so insure a uniform projection of the molds beyond the under face of the board. By changing the form of the cam 16 and by varying it in position I am enabled to change the movement of the slides, so that they will remain elevated for a longer or shorter interval and may regulate the extent of the downward movement, so that the molds may be immersed to a greater or less extent, as desired.

As before stated, these machines are arranged side by side and the shaft 13 will extend beneath them all, and by simply removing the cam any one machine will remain at rest. The molds having been placed in the moldboard, the board will be placed upon the upper ends of the slides. The shaft 19 now being driven turns the worm 18, which revolves the worm-gear 17, moving the crank 21, and through the link 22 moves the shaft 13 back and forth. The cam of required form being secured to the said shaft 13 will be moved thereby and the arm 11 bearing thereon will be raised or lowered accordingly, and as it is raised and lowered the moldboard will be correspondingly moved, so that the molds depending therefrom will be dipped into the tank and then removed therefrom, the cam being so timed that the required amount of drying or hardening may take place between the several dippings. By employing a transversely-movable shaft I am enabled to change the cams for any one machine without interfering with the operation of the other machines and without stopping the movement of the shaft, the said movement of the shaft being so slow that the cams may be removed and attached without stopping.

Having fully described my invention, what I claim as new, and desire to secure by Letters Patent, is—

1. In a machine for forming rubber articles, the combination with the table and tank thereof, of vertically-movable slides passing through said table, and a transversely-movable shaft carrying a cam adapted to raise and lower said slides, substantially as described.

2. In a machine for forming rubber articles, the combination with the table and tank thereof, of vertically-movable slides passing through said table, a transversely-movable shaft, a cam adjustably secured to said shaft, and means for moving the shaft back and forth, substantially as described.

3. In a machine for forming rubber articles, the combination with the table and tank thereof, of slides vertically movable through said table, said slides connected at their lower ends by a web, an arm depending from the center of said web, a transversely-movable shaft beneath said web, a cam secured to said shaft and upon which said arm rests, a worm, a worm-gear, and means between said gear and said shaft whereby the shaft is moved back and forth, substantially as described.

4. In a machine for forming rubber articles, the combination with the table and tank thereof, of slides vertically movable through said table, a transversely-movable shaft, means connected with said shaft for raising and lowering said slides, and a moldboard formed in its under face with recesses, and spring-fingers extending into said recesses, substantially as described.

5. In a machine for forming rubber articles, the combination with the table and tank thereof, of slides vertically movable through said table, a transversely-movable shaft, means connected with said shaft for raising and lowering said slides, a moldboard adapted to rest upon the upper ends of said slides, said moldboard formed in its under face with recesses, and clips secured to the under face of said board adjacent to said recesses, said clips comprising a plate and a transversely-bowed spring-finger, the plates bearing against the under face of the board, and the fingers extending into the said recesses, substantially as described.

In testimony whereof I have signed this specification in the presence of two subscribing witnesses.

CHARLES E. LONGDEN.

Witnesses:
FREDERIC C. EARLE,
CLARA L. WEED.